J. H. McLAUGHLIN.
RATCHET BRACE.
APPLICATION FILED OCT. 17, 1908.
935,047.
Patented Sept. 28, 1909.
2 SHEETS—SHEET 1.
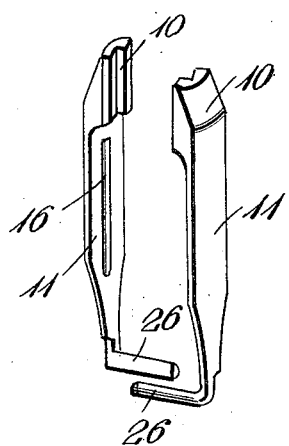
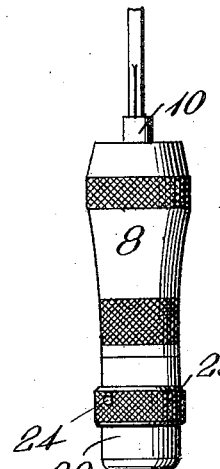
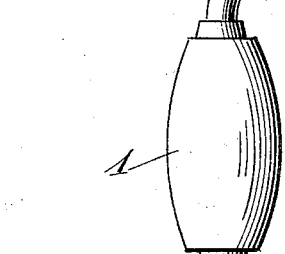
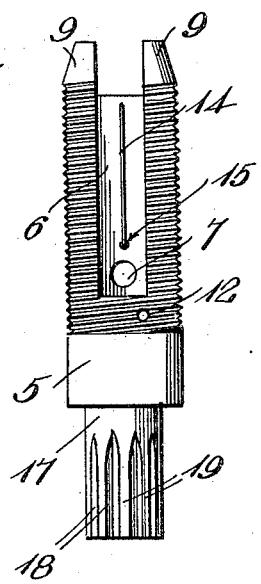
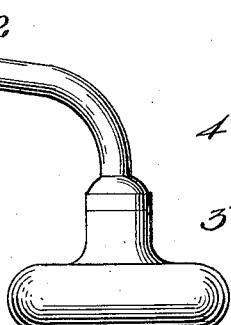
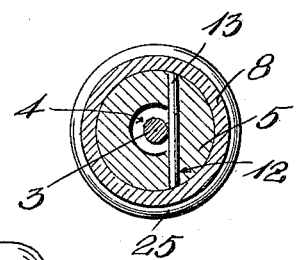
Witnesses
Inventor
J. H. McLaughlin
By John S. Duffie
Attorney

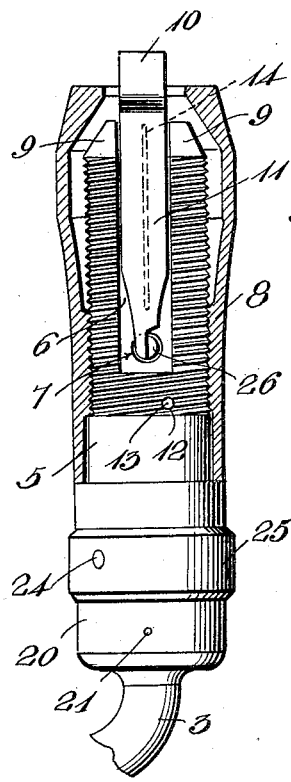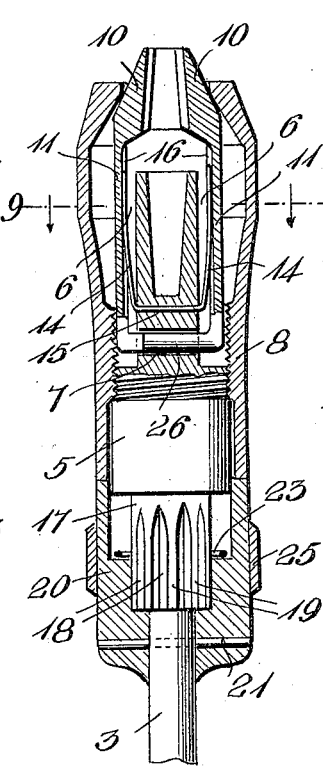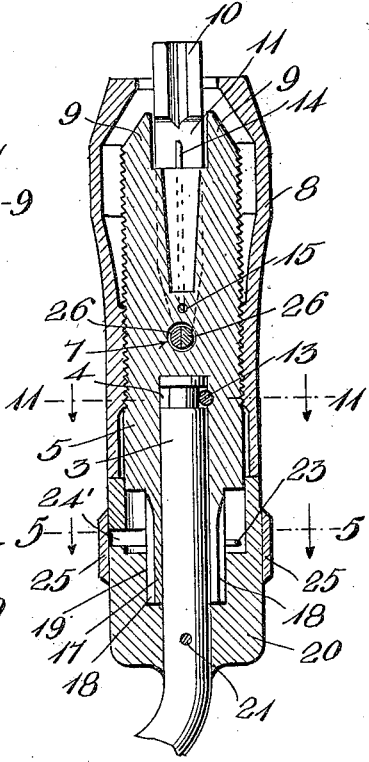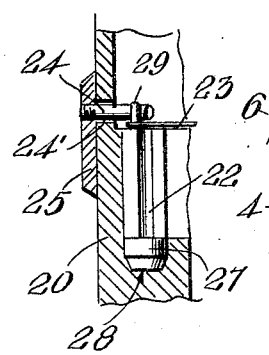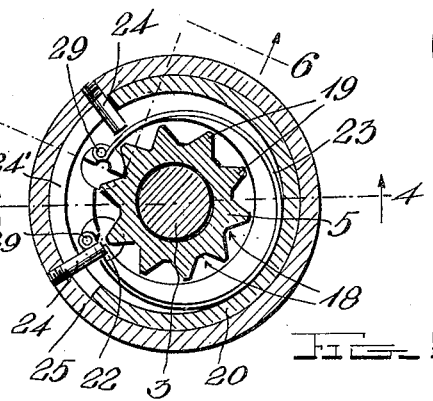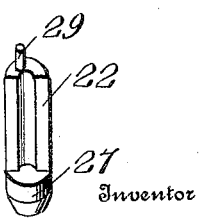

UNITED STATES PATENT OFFICE.

JOSEPH H. McLAUGHLIN, OF MILLERS FALLS, MASSACHUSETTS.

RATCHET-BRACE.

935,047.	Specification of Letters Patent.	Patented Sept. 28, 1909.

Application filed October 17, 1908. Serial No. 458,318.

*To all whom it may concern:*

Be it known that I, JOSEPH H. MCLAUGHLIN, a citizen of the United States, residing at Millers Falls, in the town of Erving, in the county of Franklin and State of Massachusetts, have invented certain new and useful Improvements in Ratchet - Braces, of which the following is a specification.

My invention has relation to ratchet braces, and resides in the head, chuck and ratchet, but has to do mainly with the ratchet.

In a large number of ratchet braces, on the market, there is a "crooked socket" for the ratchet portion, having the dogs pushing with their ends.

The object of my invention is to produce a straight socket with dogs, partially round and partially semi-circular, which have their sides to the working part.

It will be seen that I employ in the construction of my invention, jaws of that type adapted to adjust themselves to a round, square or taper shank.

For certain advantageous reasons I have constructed the iron part of the head of wrought iron instead of cast iron. One advantage of this is to strengthen said head, while, at the same time, it will be less brittle.

Upon the handle I have no claim, but represent the same in the drawings for the purpose of illustration.

With these and other objects in view, my invention consists of the novel construction and arrangement of parts as are hereinafter described in the following specification, illustrated in the accompanying drawings, and particularly pointed out in the claim hereunto appended.

Reference being had to the drawings, Figure 1 is a side elevation of the brace. Fig. 2 is a side elevation of my brace, partly in section, the handle broken away. Fig. 3 is a central vertical sectional view, taken at right angles to Fig. 2. Fig. 4 is a central vertical section, taken on line 4—4 of Fig. 5. Fig. 5 is a horizontal section on the line 5—5 of Fig. 4. Fig. 6 is a detail fragmentary section, on the line 6—6 of Fig. 5. Fig. 7 is a detail plan view of the locking ring. Fig. 8 is a detail perspective view of one of the locking dogs. Fig. 9 is a horizontal section on line 9—9 of Fig. 3. Fig. 10 is a detail side elevation of the jaw-carrying member. Fig. 11 is a horizontal section on line 11—11 of Fig. 4. Fig. 12 is a detail perspective view of the engaging members, showing their relative relation.

Referring more particularly to the drawings, my invention is described as follows:—
The handle 1, provided with the usual sweep 2, has the outer portion thereof terminating in a shank 3, provided with the annular recess 4. The jaw-carrying member 5, is provided with longitudinal recesses 6, communicating with each other by means of the perforation 7. The outer surface of said member 5, is threaded for the reception of the internally threaded head or shell 8. The outer end of said member 5, is beveled and is so constructed as to leave the projections 9, between which play the jaws 10, of the bit engaging members 11. Said member 5, is also provided with a perforation 12, at a given distance from the vertical axis thereof, through which is inserted a pin 13 (Fig. 11) engaged by the walls of said annular recess 4, of said shank. A wire hairpin spring 14, is passed through a perforation 15, in said member 5, its end portions engaging longitudinally disposed grooves 16, cut in the inner faces of said bit engaging members 11. The inner portion of said member 5, is so constructed as to leave the downwardly projecting reduced portion 17, which is provided with vertically disposed longitudinal recesses 18, leaving the ratchet teeth 19 thereon. The inner portion of said reduced portion 17, is allowed to extend into the socket 20. Said socket is held securely against movement to the said shank 3, by means of a pin 21, passing therethrough. The inside of said socket 20, is so constructed as to receive the elongated locking dogs 22, held in engagement with the ratchet teeth 19, of said reduced portion 17, by means of the spring 23, and held out of engagement therewith by means of inwardly projecting pegs 24, screwed into the collar 25, which collar is loosely mounted on the outer periphery of said socket 20. The ends of said spring 23, encircle the pins 29. The pegs 24, extend into the socket 20, through the slot 24¹, cut in the wall of said socket. The inner ends of said bit engaging members are provided with inwardly extending projections 26, flattened on one side, curved on the other, said flattened sides coming in contact with each other when said projections 26, are inserted in said perforations 7. Referring again to said dog 22, a circular cone-shaped enlargement 27, is provided at its innermost end, said enlargement 27, working in a bearing 28, provided in said socket 20, (Fig. 6). One of said locking dogs is so arranged that the flat surface of its semi-circular portion is at right angles to the flat surface of the semi-circular portion of the opposite dog. By such an arrangement the jaw-carrying member 5, may be held while the socket 20, is being revolved in either direction. When the flat surface of the semi-circular portion of either dog is turned toward the teeth 19, then that particular dog is idle, while its twin is in intermeshed relation with said teeth. It being desired to manipulate the drill in an opposite direction the collar 25, carrying the lugs 24, is slipped around on the surface of said sockets, throwing one dog out of and the other dog into intermeshed relation with said teeth 19.

Having described my invention, what I claim as new and desire to secure by Letters Patent, is:—

In a ratchet brace comprising a handle having the usual shank, the combination of a hollow socket with a jaw-carrying member, the shank passing through said hollow socket into said member, said shank being the medium whereby said member is held into the hollow of said socket, the inner portion of said member being reduced and provided with longitudinally disposed ratchet teeth, two elongated dogs, partially round and partially semi-circular, seated in bearings in the upper wall of said socket, the flat faces of said semi-circular portions being arranged at right angles to each other, each of said dogs provided with a lug at its outer end, a spring encircling said reduced portion of said member, the ends of which engage the lugs of said dogs, said socket provided with a slot, a collar provided with inwardly extending lugs loosely encircling said socket, said lugs passing through the slot of the socket, said lugs engaging their respective dogs when it is desired to reverse the position of the latter in relation to the longitudinal recesses of the jaw-carrying member.

In testimony whereof I affix my signature in presence of two witnesses.

JOSEPH H. McLAUGHLIN.

Witnesses:
GEORGE JAMES THOMPSON,
JAMES McLAUGHLIN.